Figure 1A:
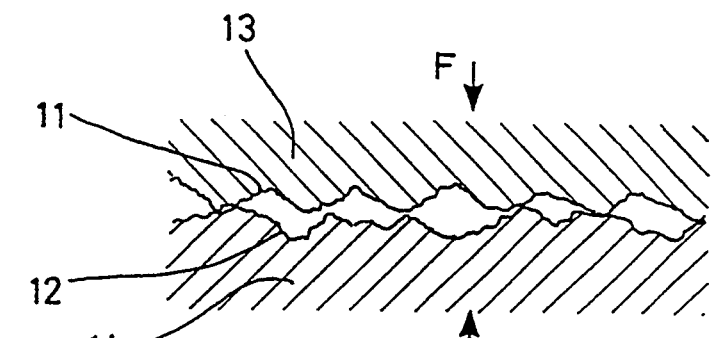
Figure 1B:
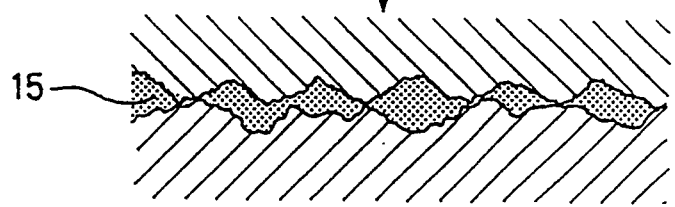
Figure 1C:
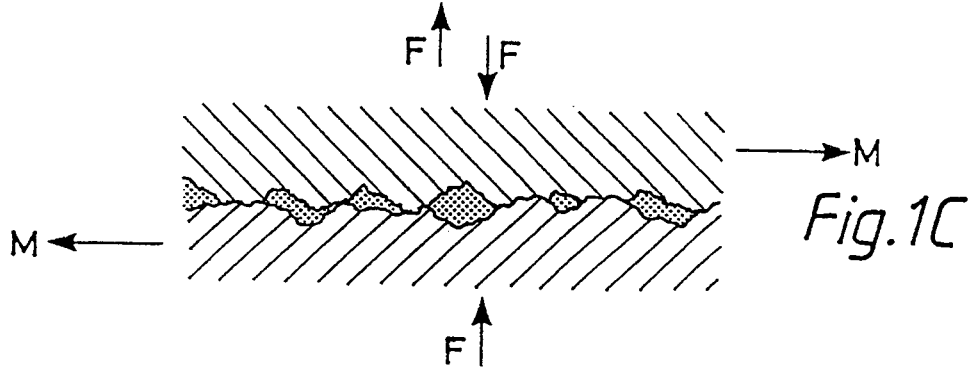
Figure 1D:
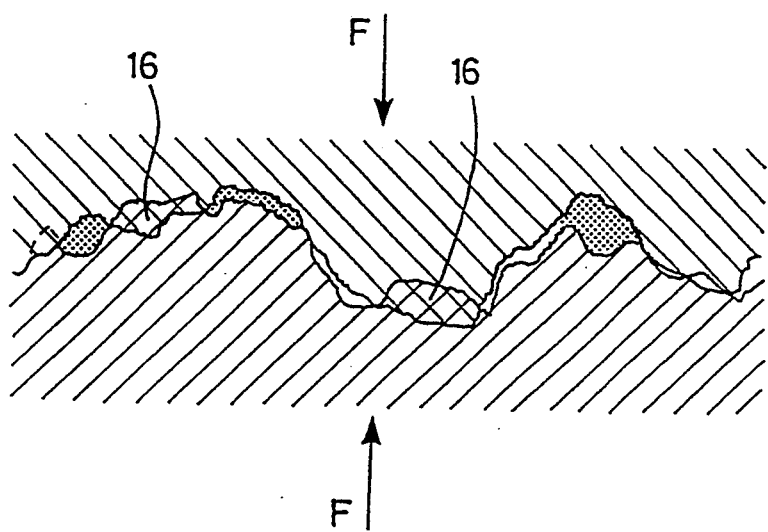

United States Patent [19]
Linzell

[11] Patent Number: 5,348,210
[45] Date of Patent: Sep. 20, 1994

[54] JOINTS

[75] Inventor: Geoffrey R. Linzell, Hatfield, England

[73] Assignee: Ball Burnishing Machine Tools Limited, Hatfield, England

[21] Appl. No.: 960,430

[22] PCT Filed: Jun. 13, 1991

[86] PCT No.: PCT/GB91/00950
§ 371 Date: Dec. 11, 1992
§ 102(e) Date: Dec. 11, 1992

[87] PCT Pub. No.: WO91/19589
PCT Pub. Date: Dec. 26, 1991

[30] Foreign Application Priority Data

Jun. 14, 1990 [GB] United Kingdom ............... 9013331.5
Mar. 1, 1991 [GB] United Kingdom ............... 9104408.1

[51] Int. Cl.$^5$ ............................................. B23P 11/00
[52] U.S. Cl. ............................ 228/115; 29/525; 29/525.2; 403/11; 403/21; 403/369
[58] Field of Search ............ 228/112, 115, 116; 29/520, 525, 525.1, 525.2; 403/11, 21, 288, 369, 368

[56] References Cited

U.S. PATENT DOCUMENTS 3,144,710  8/1964  Hollander et al. ............... 228/112

FOREIGN PATENT DOCUMENTS 13509  7/1980  European Pat. Off. .
24291  6/1985  Japan .

Primary Examiner—Kenneth J. Ramsey
Attorney, Agent, or Firm—Synnestvedt & Lechner

[57] ABSTRACT

The invention relates to a method of making what may for convenience be regarded as friction joints—that is to say, joints between the touching surfaces of two parts that are held in contact (by a force as experienced in a light interference, not one sufficient to cause forging) and that would otherwise move laterally past one another parallel to the touching plane, the method involving some minimal initial lateral movement of the two surfaces sufficient to cause some asperity deformation, leading to welding and shearing under special conditions—the phenomenon of "galling"—but not sufficient to raise the bulk temperature of either to a level where bulk welding will occur. More specifically, the invention provides a method of securing against lateral motion two bodies (12, 14) held in face-to-face (11, 12) asperity contact, thereby to make a join between the two bodies, in which method there is inserted into the interface between the two bodies a material (15) that on minimal initial lateral relative motion of the two surfaces promotes rapid but controllable "galling" (16) between the two surfaces, this galling binding the surfaces against further such motion.

17 Claims, 11 Drawing Sheets

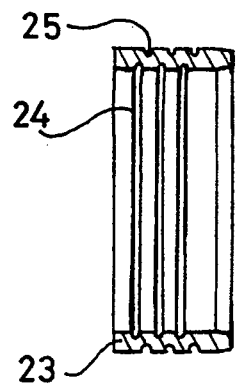
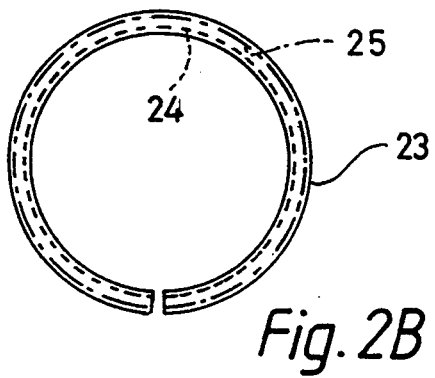
Fig. 2A  Fig. 2B
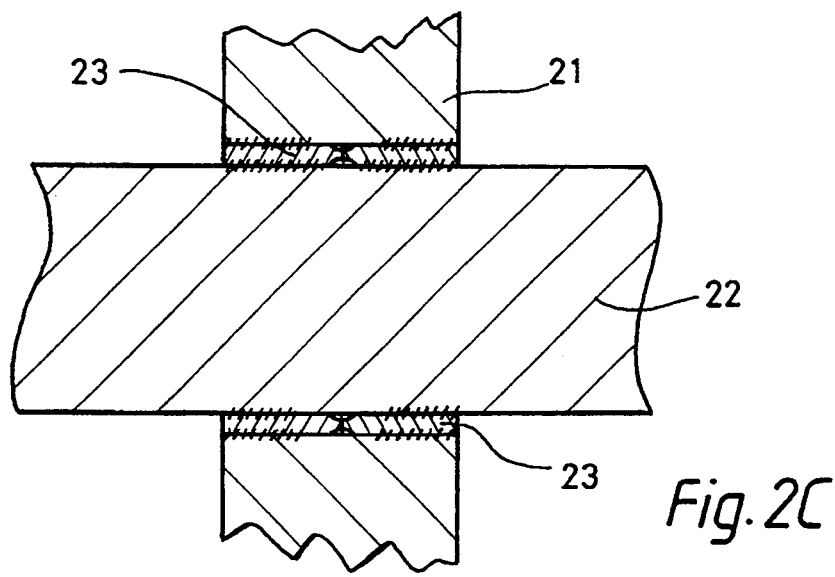
Fig. 2C
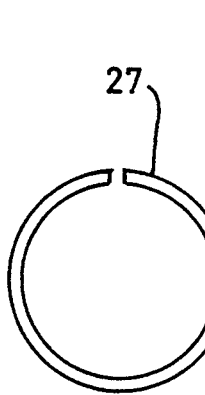  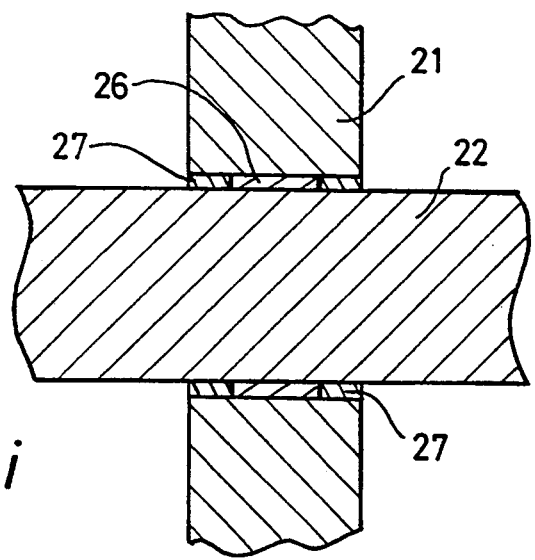
Fig. 2Di  Fig. 2Dii  Fig. 2Diii

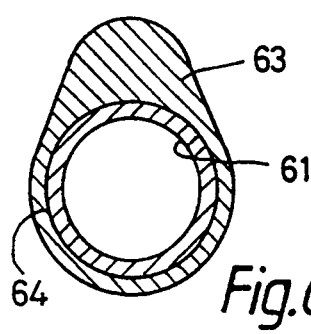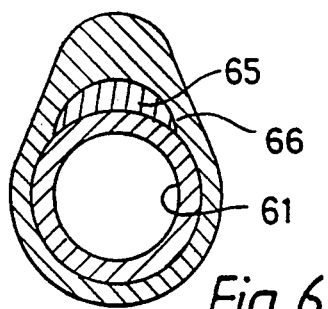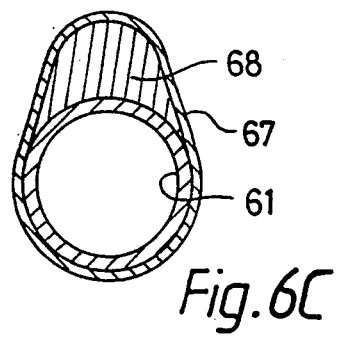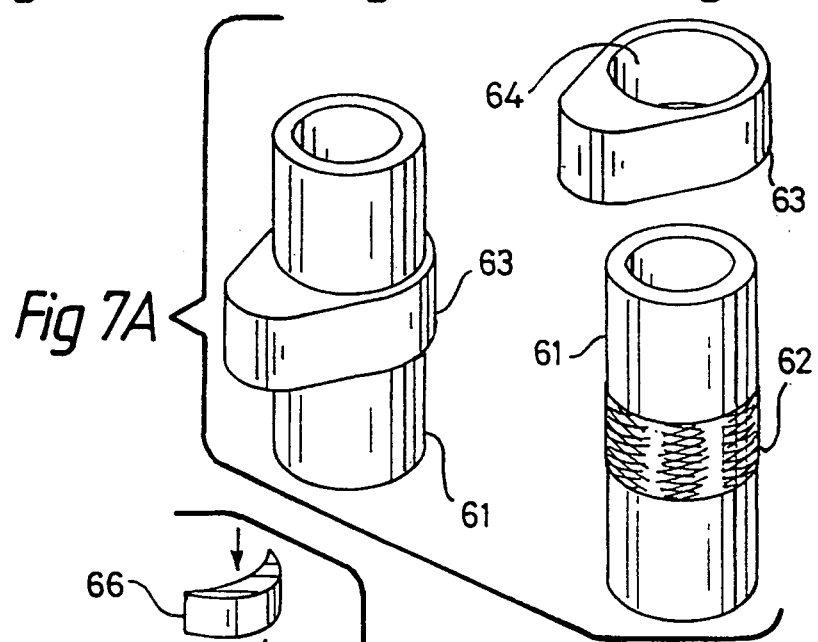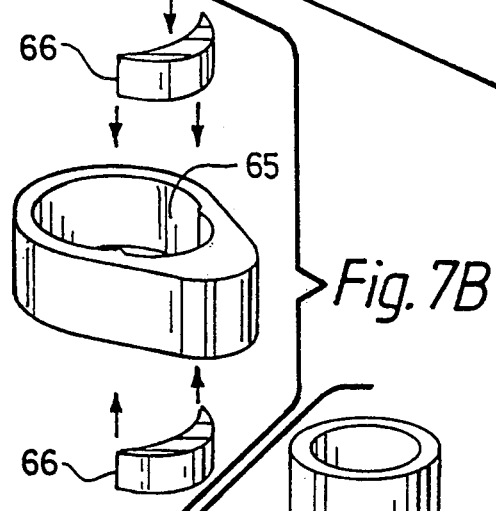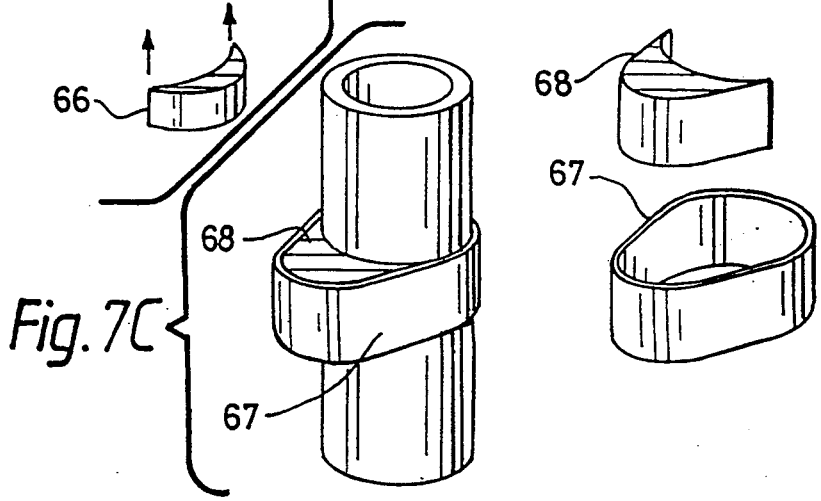

JOINTS

This invention relates to joints, and concerns in particular joints in which the bond between two surfaces is caused by friction and other intersurface forces jamming the two together.

There are many ways in which one article can be joined (or jointed) to another, and those appropriate for use in any particular case will generally depend upon the circumstances. For example, two pieces of wood can be joined by nails or screws, or by some cunningly shaped interlocking joint, with or without glue, while two pieces of metal can be glued, soldered, brazed, welded, bolted, riveted . . . and so on. It is even possible to make good joints that are held together simply by the friction between the two parts. For instance, the pegs holding the strings of a violin stay in place purely by friction between the side of each peg and the side of the hole it is pushed into, and friction, or "interference", fits of one metal article onto another are quite common, examples being the securing of a gear-ring to a flywheel, typically as used in an automobile engine, and of a metal tire to a railway wheel. A friction joint usually has only shear strength, thus resisting motion in the "plane" of the join (such as might be caused by torsional or push-off forces), and effectively no tensile strength, thus not resisting pulling forces normal to the join. Indeed, such joints show no residual tensile strength if the forces maintaining the two bodies together are removed, and usually fall apart. Nevertheless, this can be perfectly acceptable provided the application, and specifically the physical design of the joint itself, allows for this. Thus, a joint between a rod- or shaft-like member and a body fitting, collar-like, around it, as in a violin string peg fitting into the hole in the neck of the violin, is quite satisfactory; the pegs lock tight against rotation even though they pull out quite easily.

A type of joint that involves friction in its formation, though it does not use friction as the bonding force, is the friction weld, where the two parts are rubbed repeatedly and rapidly against each other (typically several hundred times in a few seconds) until the friction between the touching surfaces makes them hot enough for their material to soften and then to mix when the rubbing is stopped and the two faces are forced/forged together (with forces of the order of tons per square inch (or a few hundred Newtons per square millimeter), expelling any contaminated remnants from the original surfaces)—to cause complete fusion between the bodies—to give a true weld (molecular interpenetration) of one part to the other. It is possible, but not common, to employ some form of friction promoter—a fine abrasive grit such as carborundum (alumina) or sand (silica)—between the two surfaces; once they are heated up, however, the promoter is squeezed out as the two surfaces are pushed/forged together (again with considerable "upsetting" deformation) to make the weld itself. A welded joint made in this way has, like any true weld in which the material of the two parts has actually interpenetrated, both shear (sideways) and tensile (lengthways) strength, which may well be an advantage, but suffers from the considerable disadvantage that the two parts must be heated to a relatively high temperature, which will result in heat-affected zones either side of the joint in which the basic state and physical condition of the material may be significantly changed.

Another type of metal-to-metal joint involving friction during formation, but without the generation of high temperatures within the bulk metal, is the cold pressure weld, especially that form thereof known as the cold pressure shear weld. To produce reliable results with this method, the surfaces must be carefully pre-conditioned (by wire brush cleaning immediately before assembly, or preferably nickel plating).

In an ordinary cold pressure weld the two pieces to be joined are forged together with a force sufficient to cause between 30% and 60% surface enlargement at the interface (as with friction welding, this is several hundred Newtons per square millimeter). This severely disrupts the oxide layer normally covering the surfaces (see below), allowing the underlying clean, unreacted metal surfaces then to come into intimate contact under the still-applied external forging force; they then fuse together by molecular diffusion, forming a true welded bond having good tensile strength. In the shear version there is applied as well slow relative sliding and shear forces (these are then discontinued to allow the weld to take place under the maintained forging force), to give improved bonds with a reduced degree of deformation.

The present invention relates to a novel, and extremely superior, method of making what may for convenience be regarded as friction joints—that is to say, joints between the touching surfaces of two parts that are held in contact (but not by a force sufficient to cause forging, as in the above-mentioned cases) and that would otherwise move laterally past one another parallel to the touching plane (and so normal to the holding force), the method involving some minimal initial lateral movement of the two surfaces sufficient to cause some asperity deformation, welding and shearing (welding between opposed and touching microprojections) under special conditions but not sufficient to raise the bulk temperature of either to a level where bulk welding will occur. The method, which can result in joints having as much as 90% of the shear strength (resisting further lateral movement) of the weaker material of the two joined bodies, but with the expenditure of as little as 5% of the energy necessary to form an actual friction weld, involves the phenomenon of "galling" (as explained below; the special conditions lead to extremely rapid, even exponential, galling—build-up of material transfer—and ploughing, so as to form two physically interlocked arrays each of which is bonded to its respective surface by welds but is not so bonded to the other).

Under the ambient conditions on Earth—an atmosphere to a large part formed of the highly reactive gas oxygen—the surfaces of most common metals (such as iron or aluminium) are covered in an oxide film. When two chemically similar metal surfaces are rubbed together, with sufficient force—of the order of a few tens of Newtons per square millimeter—normal to the motion so as to hold them in firm contact, it is common for microwelding shear forces ("friction") to occur between the two as a result of plastic deformation of the material at asperity contact points (where the oxide film is disrupted) at either or both surface, and for microscopically small amounts of material from one surface to be deposited on the other (if one is of a relatively soft material, then that is deposited on the harder), resulting in wear. The rate of this transfer is controlled generally by the ability of the surface to repair the damage to its oxide layer (or by the interposition of other materials, such as lubricants with chlorine-containing additives to produce chlorides at the oxide-damage site, to act as a temporary substitute for the oxide layer). Under most conditions the situation is self-regulating, and the effect is to keep the transfer minimal.

The deposits are referred to as "galls" by analogy with the biological gall (defined as an abnormal localized swelling or outgrowth), and the process of their creation is known as "galling". It might be expected that galling between two adjacent surfaces held together would enhance a frictional joint between the two; what has now been found is that extensive such galling can reliably be caused with minimal rubbing motion of the two surfaces, and under minimal pressure, and that the "friction" joints that are then formed are extremely strong in terms of their ability to withstand further lateral movement (the coefficient of friction between the two surfaces can be raised to and controlled at values of from 0.1 to 5, and even greater). More particularly, it has been found that such joints can readily, reliably, predictably and controllably be formed with the use of an "anti-lubricant"—a "seizure agent"—to cause the two touching (especially metal) surfaces to bind together against sliding movement.

In one aspect, therefore, the invention provides a method of securing against lateral motion two bodies held in face-to-face asperity contact, thereby to make a join between the two bodies, in which method there is inserted into the interface between the two bodies a material that on minimal initial lateral relative motion of the two surfaces promotes rapid but controllable "galling" between the two surfaces, this galling binding the surfaces against further such motion.

The term "galling" as used herein refers both to the formation of visible, significant galls as quite large quantities of material are transferred from one surface to the other, and to the formation of visually less significant, even microscopic, galls in those not infrequent cases where the amount of material transferred is much smaller—albeit effective. In a more general sense, then, the "galling" effected in the method of the invention is, and may be defined as being, the result of high levels of friction evenly disrupting the relevant surfaces and causing controlled transfer of the surface material from one body to the other to produce an "array" of mechanically meshing recesses and protrusions that, as a result of the intimate face-to-face contact between the two surfaces, couple together and interlock to resist further lateral motion.

The invention provides a method of securing two held-together bodies to make a join (or joint). The bodies are secured against relative lateral motion—that is, against motion that is in any direction generally parallel to the "plane" of the surfaces at the contact point, and so is normal, or sideways, to the forces holding the two together (where, as is discussed further hereinafter, one body is cylindrical, and fits in a matching aperture in the other, their two touching surfaces can be moved laterally relative one to the other either by sliding the one axially back and forth in the aperture or by twisting the one around its axis relative to the other). This method can especially be applied to forming a joint between the two bodies where the shape of the bodies, and the way in which they interact, is such as to hold them together, and the need then is for some way of preventing them sliding relative to one another sideways to the holding forces (as in the case of the violin peg; it is pushed into the hole, with its sides in contact with the sides of the hole, and the friction between the two prevents it rotating in the hole [although as a result of its taper axial movement back out of the hole causes the surfaces to move out of contact, the constraining forces to vanish, and there are no longer any lateral-motion-restraining frictional forces]). As exemplified in more detail hereinafter, joints held together as a result of their shape-derived interaction are usually of the type (like the violin peg) where one body is within and surrounded by the other—they are concentric or axio-symmetric joints—so that the necessary retention of the two bodies together and in contact is merely a matter of the shape and design of the joint, coupled with the physical properties of the bodies. A typical example is that of a ring-shaped member mounted on a shaft, as met in cams on camshafts, weights on counterbalance shafts, interconnecting webs in crankshafts, and gear wheels on gearshafts, or as met in pieces locked together via a joining collar, such as two rods or pipes joined by a connector ferrule.

Although it will be apparent from what has just been said, it is worthwhile noting specifically that the bodies to be joined by the method of the invention are held together in asperity contact (that is, they are actually touching, and in face-to-face contact), but not with such a force that they are likely to undergo any significant cold welding. In other words, the forces involved are merely for retaining the two bodies in the desired face-to-face contact, and are not forging forces (and so are insufficient to cause any gross deformation of either body).

The method of the invention applies in principle to bodies of any material if there can be caused galling between the two; the resultant strong frictional forces will resist, and even prevent, any further lateral motion. However, in practice the method, while notionally applicable to bodies made from materials such as plastics and ceramics (steel will gall onto alumina or zirconia ceramic materials), is really best suited to bodies made from metal. The metal may be any of the commonplace metals, such as iron, copper and aluminium (and their alloys), as well as the slightly less usual ones, such as nickel, cobalt and titanium (and their alloys), but whereas pieces made from the same metal can be binded in this manner that is not always so when the pieces are of different metals. Thus, whilst iron (and its common alloys, such as steel) binds acceptably with aluminium, copper and its alloys (typically, bronze) binds much less successfully to other metals (such as iron and aluminium). Indeed, as noted hereinafter, use can be made of this to make locating bodies that guide but do not bind. For the most part, the method of the invention seems especially suited to the making of joints between bodies of iron and its alloys. These alloys will commonly be steels, and both ferritic and austenitic will bind to themselves and to each other.

Where both bodies are formed of materials which are very hard—such as is the case with some tool steels—it may be more difficult than normal to carry out the galling process, for with materials as hard as those the necessary plastic deformation of the surface material of at least one of the bodies, the material transferred therefrom making galls on the other, will only occur if the hard surface can be suitably conditioned to accept the other material without causing significant structural damage to the bulk of the bodies. In such a case the method of the invention may be effected using an intermediate body, of a satisfactorily soft material, disposed between the two hard bodies like the filling of a sandwich, so that the one hard body binds to the softer intermediate, and the intermediate binds to the other hard body—and thus the two bodies effectively bind one to the other.

Viewed another way, the method of the invention in the case of using an intermediate body is in essence a two-fold application, where the intermediate is one body, but is itself binded to two different bodies, one on either side.

An intermediate body used in this manner may itself be of significant dimensions, rather like a chunk of cheese between two slices of bread, and this has some valuable applications in cases where, as discussed further hereinafter, this intermediate body may be a reservoir for the gall-promoting agent. However, it will often be sufficient merely to have the slightest layer, possibly no more than a few micrometers thick, of intermediate material between the two more substantial bodies that are to be binded, rather like two slices of bread with little more than a thin film of butter between them. In these cases it will normally be necessary to deposit the layer on the relevant face of one or other of the two bodies proper, before they are assembled together (any convenient means of chemical or physical deposition can be employed).

In the method of the invention a material—a gall-promoting, binding or "seizure" agent—is inserted into the interface between the two bodies, this material being one that on minimal initial lateral motion of one surface relative to the other causes rapid "galling" between the two surfaces, resulting in the two seizing or binding together (the initial galls act as sites for further transfer of material as the continuing motion causes their physical disturbance and subsequent mechanical surface disruption, the whole process rapidly building up in a non-linear, even exponential, fashion). This is a key factor of the invention, and—at least in so far as it applies to metal-to-metal surface sliding—stems from an observation made when investigating certain so-called lubricating agents (that is, materials, such as the mineral oils, intended to reduce friction between sliding metal surfaces under boundary lubrication conditions). Most metal lubricants are mineral oils (or derivatives thereof), often with various extreme pressure additives, such as chlorides, to improve their boundary lubrication properties. Mineral oils are medium molecular weight hydrocarbons. They are ideal for hydrodynamic use, and although with additives they can be useful boundary lubricants they also have considerable limitations in metal forming operations where large surface deformation exposes unreacted metal. Accordingly, much research has been devoted to finding acceptable substitutes. One particularly interesting class of substitutes has been that of the silicones, which are polymers of diorganyl siloxanes [—O—Si(R$_2$)—], and commonly referred to as polysiloxanes, the medium molecular weight versions of which are oils.

Now, some silicone oils—some polysiloxanes—have proved useful as lubricants, particularly between plastics; however, when used on metals, notably iron-based metals, they have demonstrated a tendency towards the opposite effect. Indeed, it has been noted that these silicone oils when used in small quantities (to form naturally thin films) can in fact result in predictably increased levels of friction between sliding metal surfaces, so acting as so-called "anti-lubrication" agents—that is, they appear to have little or no static or boundary lubrication properties, and appear instead positively to promote friction-causing galling. Accordingly, for applying the method of the invention to the binding of two metal surfaces, there is very preferably employed, as the material promoting the galling (as the "anti-lubricant", or "seizure agent"), a suitable silicone oil. Details of the chemical nature of the preferred silicone oils are given hereinafter.

The anti-lubricant/seizure agent may itself directly promote galling, or it may do so indirectly, by giving rise, under the conditions of use, to a material that does itself promotes galling. The silicone oils are believed, when subjected to the heating (chemical) or shear forces (mechanical) generated by minimal initial lateral motion (as the various "high" points on the two surfaces interact with each other, in asperity contact), to break down chemically into a form that promotes "galling".

As noted above, the surfaces of most common metals (such as iron or aluminium) are covered in an oxide film. However, galling between two metal surfaces is a phenomenon that appears to occur most easily when the surfaces being rubbed together are clean, and when the protective oxide layer has been disrupted or chemically weakened. Accordingly, to promote galling it appears desirable to employ a material that acts to remove any surface oxide (and preferably to stop such a layer re-forming, perhaps by scavenging free oxygen from the environs). It is believed that such an oxide-layer-removal and oxygen-scavenging action is effected by the preferred silicone oils. More especially, it is believed that the preferred silicone oils are materials that break down into products having strong oxygen-scavenging properties, whereby not only are the facing surfaces of the two metal bodies to be joined cleaned of some of any oxide layer thereon but the remaining material acts as a barrier to delay further oxygen entering the joint and re-establishing the oxide layer while the joint-forming process is under way.

The silicone oils suitable for use as the gall-promoting agent may be one or more of many different types, and because their properties are not necessarily the same it may be advantageous to employ a mixture of several different oils carefully tailored to have the required physical and chemical properties, different materials possibly being used for different metals or combinations of metals. Individual polysiloxane oils may be linear, branched or cyclic molecules (or combinations) having a wide range of molecular weights and properties, though materials that are liquids and of relatively low viscosity (about 50 c/s or less, some as little as 10 c/s) are preferred, because they are easier to insert into the interface and appear to be more effective as gall promoters. Typical examples of such materials are the medium molecular weight poly(dimethyl)siloxanes, especially those materials commercially available from Dow Corning under the Marks MS 200, Dow Corning 531 and 536, and Dow Corning 344 and 345, all of which are fully described in the relevant Data Sheets. The MS 200 materials, which have many uses including that of lubricants, are siloxanes of the general formula $$Si(R_3)—(O—Si[R_2])_n—O—Si(R_3)$$

wherein each R, which may be the same or different, is hydrogen or an organic radical, typically an alkyl or aryl group, such as methyl or phenyl, and n is an integer from 1 to about 2000. The 531 and 536 materials, whose normal use is in polishes, are amino, methoxy functional polydimethylsiloxanes (the contained functional—that is, reactive—amino and methoxy groups cause the materials to bond chemically to the surfaces to which they are applied, and to polymerise further in the presence of water vapour, changing from liquids into rubbery solids). The 344 and 345 materials, normally used in cosmetic preparations, are respectively cyclic tetramers and pentamers of dimethyl siloxane.

The polysiloxanes are noted for their temperature stability, but nevertheless they break down under severe heating—at temperatures above 300° C., which are to be expected at the asperity contacts when two surfaces are rapidly rubbed together—to give silyl moieties that are highly active scavengers of oxygen, and will easily remove the oxygen from the vicinity in an oxide layer such as that found on an iron or aluminium body, locally reducing the layer to the metal. Thus, when used as the gall-promoting material, and inserted as a thin film between, say, two steel surfaces, the rubbing of the surfaces under minimal initial movement and contact pressure causes the polysiloxane to break down, the breakdown products locally remove (wholly or in part) the protective oxide layer, and the subsequent rubbing produces local welding resulting in galling, whereupon the two surfaces bind together to prevent further movement. However, because the temperatures generated at asperity contacts will to a considerable extent depend upon the nature of the materials—copper being much softer than iron, and being a better thermal conductor, copper-copper contact results in lower temperatures than iron-iron contact, for example—the particular (polysiloxane) gall-promoter may need to be chosen carefully to reflect this difference (and it may even be desirable to select a more reactive silicon material, such as one of the silanes commonly employed as precursors in the preparation of siloxanes).

Though possibly it goes without saying, nevertheless it seems worth observing that the two surfaces to be joined by the method of the invention should be reasonably clean, for otherwise the required galling may not occur. Most metals are clean enough once subjected to the normal industrial degreasing processes, and no more need be said about the subject at this time.

It may also be worthy of note that the physical pre-treatment of the surfaces to work harden their asperities and disrupt their oxide film layer, as by brushing (with a wire brush, say), may make some marginal improvement in that the minimal initial movement necessary to cause galling, and then binding, may be reduced, but in general such a pre-treatment does not seem to be especially beneficial. And in the same context it may be noted that the addition to the gall promoter of a material such as alumina that itself causes friction (as is employed in some friction welding) not only resulted in no improvement, it actually made the joints worse. This is probably because the added "grit" prevented the two surfaces contacting one another properly, and so actively reduced the amount of friction-inducing galling that took place.

Where, as is so with the preferred agents, the gall-promoting properties of the material come from its heat-derived breakdown products, it might seem an advantage to pre-heat the joint immediately after assembly and insertion of the gall promoter and prior to the actual galling step of effecting relative lateral motion. In practice, however, pre-heating to the sort of temperature needed (about 700° C.) for around 15 minutes made no significant difference to the strength of a properly-designed joint, and though the joint required only half as much initial lateral movement to form it this pre-treatment does not in general appear to be a worthwhile step.

The gall-promoting material—the seizure agent, or anti-lubricant—is inserted into the interface between the two bodies, and in general this should be accomplished so as to make the agent equally available and evenly distributed across the rubbing surfaces. There are many suitable ways in which the insertion can be carried out, and which is chosen will depend upon the particular application (that is, the type of joint which the method of the invention is being employed to make). For example, in some cases it may be sufficient to assemble the two surfaces (the joint) and then "inject" the seizure agent between the two, perhaps from an outside source, or possibly from a "reservoir"—such as a sealed recess communicating with the interface, or a porous carrier positioned immediately adjacent the interface—within the joint itself (relying on capillary action and the wetting capability of the agent to carry it into place over all the two opposed surfaces). In another case it may be more convenient first to distribute the gall-promoter on the appropriate surface of one or other body, and then to position the bodies one on or over the other. In either of these two cases it may be desirable in some way to pre-treat one or both surface the better to hold the agent (for example, by physically roughening, or by milling or fettling to give it a "knurled" finish in the form of an array of raised points no more than 0.05 mm high and at a density of about 2 to 3 per square millimeter, so that it can carry by flow, and hold, more of the agent material). A third possibility is to place between the surfaces a carrier of the agent material—a thin layer of sponge, or of the intermediate body (see above), or a porous, scored or recessed shim, jam or washer, soaked in the agent (a porous sintered carrier is especially useful, as discussed further hereinafter)—which is squashed or otherwise deformed to release agent into the joint upon the initial movement of the two surfaces (depending on the nature of the joint, this may be a particularly convenient way of ensuring that the agent is uniformly distributed over the two surfaces, so causing correspondingly uniform galling). Either the two bodies may be correctly located one relative to the other, and the carrier then driven between the two (and it may on occasion be advantageous to employ two such carriers, driven between the two bodies from either side of the joint), or the carrier can be positioned on the relevant surface of one of the bodies, and the other body then driven over it into place. If the carrier is of a suitable soft material then it may itself be involved in the galling process, as a sacrificial agent—an intermediate body, as mentioned above—that is transferred to the neighbouring harder surface. A fourth possibility—a modification of the porous reservoir mentioned above—is a flexible seal, of sponge rubber or the like, soaked in the agent, which seal is deformed, as the joint is assembled, to eject agent out into the interface and then to seal the joint against the escape of the agent.

One especially preferred form of shim or jam is that made from a porous sintered material in which the gall promoter is absorbed. As such a sintered carrier is forced into the smaller gap between the two faces to be binded so it is squeezed (and its density increases). This change in size causes many small internal plastic deformations, leading to high adiabatic temperatures likely to "activate" the carried gall promoter—and if the latter is of an oxygen-scavenging kind (like the polysiloxanes)

then it will purge itself of any dissolved oxygen, and so enhance its effectiveness as a gall promoter.

Where there is employed an intermediate body/carrier then the very act of inserting it into place may—as will be the case where a deformable shim or jam, say, is driven into the restricted space between the two main surfaces—provide the relative lateral motion necessary to cause galling (between the intermediate body and the surfaces on either side) and result in the joint being formed. Alternatively, where a carrier is positioned on one body, and the other is then driven in place over it, that relative motion between the two bodies may itself constitute the motion necessary to cause galling.

The speed of the initial gall-promoting motion is important, particularly when a shim or jam is being inserted into the interface. For each pair of bodies there is an optimum speed determined by the material (and its rate of local softening), where the energy required is at a minimum. This optimum is best found by experiment (it is in any case sensitive to any initial interference between the two pieces), but by way of guidance it may be said that the initial motion should preferably be over within half a second, and usually, and for small movements, about a tenth of a second. In general, this will mean motion at from 10 to 30 mm/sec. When carrying out the movement, and especially when inserting a shim or jam, a reasonable degree of control should be exercised in order to avoid possible distortion. It may help gently to taper the jam—a taper of around 4° or less is suitable—to permit the jam to be partially inserted without any significant rubbing, the remaining insertion then being carried out with the two opposing faces acting as guides and thus reducing the risk of distortion.

On minimal initial lateral motion the seizure agent causes rapid galling between the two surfaces, this galling binding the surfaces against further motion. Exactly what constitutes minimum initial movement, and the exact form this movement should take, depends upon the circumstances, and in particular upon the type of joint being made (as regards the type of movement, it will normally be a bodily sideways slipping motion of one piece relative to another, but in some cases, as when a wheel-like member is placed co-axially over a tube, the movement can be achieved by the expansion of the tube into contact with the wheel member, so that the tube is in effect extruded). Several specific cases are discussed further hereinafter, but in some—such as a 20 mm deep, 50 mm diameter gear-wheel being attached to a 22 mm diameter shaft, or when a shim or jam is forced into the gap between two main bodies (as just described)—the two bodies may be held together so tightly (by what is in effect an elastic extension or compression of one or other of the members) that a relative displacement of a few millimeters (5 or so) may be sufficient, whereas in others—such as a linear energy absorption device, where the area of the original contact means that the degree of motion-preventing galling can be predetermined to reach the necessary level at different points along its travel—the relative movement might be as large as 25 centimeters or even more. Where, as will perhaps most often be the case, the joints are of the co-axial, or axio-symmetric, variety the movement may correspond to an angular movement of as little as a few degrees or as large as 90° or even more.

The method of the invention requires that the two surfaces to be binded together be held in face-to-face, asperity contact. The forces required to do this are minimal, just as the initial motion required to cause galling is minimal, and though it is not easy to put definite figures on them it is nevertheless possible to say that they should be of the order of tens of Newtons/mm$^2$ (rather than the hundreds of Newtons/mm$^2$ common in forging two bodies together in a friction weld). For the most part, where the application of the method of the invention involves one body within another (as in a gearshaft carrying a gear-wheel), the holding forces required are provided by the elastic nature of the two bodies—one slightly extended, the other slightly compressed—as the one is held in a fixed spatial relationship in the other. For a typical mild steel, for instance, with a tensile yield strength of 300 Newtons/mm$^2$, the restraining forces between two bodies in a light location fit—an H7/p6 interference fit—are around 5% of the yield strength—that is to say, about 15 Newtons/mm$^2$—and this is a typical figure for the minimal forces required.

The motion, and the galling, are rapid. As noted, the expression "rapid" is difficult to define, but is generally of the order of half a second or so, down to about a tenth of a second. Where relatively large relative motions are effected, the speed with which they are carried out is likely to be around 20 mm/sec.

The method of the invention enables two bodies to be joined one to another, the bodies' contacting surfaces binding one to the other against further movement because of the galling-enhanced friction between them. But of course the frictional forces binding the two bodies can be overcome (provided the bodies themselves do not break or distort first) by the application of sufficient force, and this factor can be taken advantage of, in accordance with the invention, to provide joints which are deliberately constructed to "fail", allowing (limited) slip to occur between the two bodies, under certain specified and predetermined conditions and level of applied force. While the point at which a joint slips can be determined by joint design (and in particular by the area of the joined surfaces and the shear strength of the weakest material in the joint; in general, and for a joint between two bodies made of steel, the joint shear strength can be estimated as 55% of the weaker material tensile yield strength multiplied by the joint overlap area), a suitable slip point may also be achieved by including within the interface a material that is not involved in the galling process, and so limits the amount of galling that takes place, resulting in a limit on the frictional forces binding the joint against relative lateral movement. For example, when using a shim, jam or washer (as discussed herein) to provide the anti-lubricant agent to two steel surfaces, if there is employed a sintered jam that has copper particles therein then the strength of the joint formed by galling will depend on the amount of copper in the jam, both because that copper takes no part in the galling and because in some way not entirely clear copper actually limits gall build-up, so avoiding heavy ploughing between the two faces.

Use may be made of the limited slip capability of a joint of the invention in absorbing transient peak overload energies in power transmission systems, or for limiting torque applied when tightening nuts and/or bolts, or for limiting linear (tensile) loads in bolt shanks.

Of course, if this limited slip situation is to allow the joint to reform once the slip-causing forces are removed, then to ensure that the necessary friction-inducing galling continues to take place it is important that there still be some of the gall-promoting agent present between the surfaces. This can be achieved in a number of ways—for example, by sealing the joint area to prevent the agent escaping (and fresh oxygen entering), by designing the joint to include a small reservoir, opening to the interface, of the agent, or by employing a carrier for the agent which stores enough to provide sufficient for at least a second galling and joint-formation operation. In many cases it will be desirable in some way to seal the joint to prevent the remaining agent leaking out, and by happy coincidence it transpires that, as noted herein, some of the preferred silicone oils (such as DC 536) can polymerise in the presence of water vapour to form rubber-like materials. Thus, if, after a joint is binded (and the remaining anti-lubricant is leaking out around the edges), the joint is exposed to water vapour, the edges become sealed with the created silicone rubber, and the rest of the agent is retained until needed. An alternative sealing method relies on the provision of agent-retaining sealing lands within the joint, the land material being one that does not bind to the joint materials by a galling process as used—as noted above, copper (and its alloys) will not bind to iron (and its alloys) by the method of the invention. Suitable lands—an example is discussed further hereinafter—not only seal in the gall promoter, they also prevent any intermediate body (such as the gall promoter carrier) being squeezed out as the binding action takes place.

The method of the invention makes slide-resistant joins (or joints) between bodies, and the invention extends to these joints per se. Thus, in another aspect the invention provides a joint between two bodies constrained in face-to-face contact and binded against lateral motion by the method of the invention.

The method has a practically unlimited number of applications, although for the most part the joints made therein fall within four main categories, as noted hereinbefore. The first is the type wherein pieces are locked against rotation onto shafts (such as cams onto camshafts, weights onto counterbalance shafts, interconnecting webs in crankshafts, or gears onto gearshafts); such joints transmit or resist torsion forces and axial thrust. The second is the sort wherein pieces are locked together against both rotation and translation via a joining collar (such as two pipes joined by a connector ferrule). A third type is that wherein the joints are designed specifically to slip under an appropriate applied load, and so find application as torque limiters and energy absorbers. A fourth variety is a special category of joints which are not "round" but are instead one body secured against linear motion within a slot in another, as typified by a hardened cutting blade in its holder, or a turbine blade assembled onto its hub. Various particular applications of these types are now described in more detail, it being appreciated that the invention specifically extends both to the application of the method to make such a joint and to such a joint when so made.

Piece-to-Shaft Locking

One prime use for the method of the invention is to secure a piece such as a cam, gear-wheel, lever, flange, boss, armature, counterweight or interconnecting web onto the shaft that is to carry it. It is easy to see that in principle this application of the method merely requires the piece to be assembled onto its shaft in the correct place as a tightish fit (of the sort more correctly referred to as a light interference fit), possibly with one or other surface roughened (by fettling or knurling), with the gall-promoting agent suitably distributed between the relevant opposed faces, and then for relative lateral/rotational movement between the two—such as by driving the piece around the shaft—to be effected in order to cause galling and result in the frictional forces between the two binding them together against any further rotational movement. The precise details of how all this is carried out—how the piece is correctly located on its shaft, how the gall-promoter is inserted into place, and how the relative movement is induced—may vary depending upon the specific application.

A gear-wheel may conveniently be located on its shaft in a jig (or, these days, a computer-controlled positioning device), or by a ring of gall-promoter-carrying knurling, or up against a step, or by a pair of spaced ring-like lands (conveniently of a non-binding material) standing slightly proud of the surface, on which lands the wheel is a tight fit (the space between the lands being filled with a porous split collar, or shim, carrying the gall-promoter, and the lands not only locating the wheel, but also preventing the relatively soft material of the carrier shim flowing out, away from the joint, as it is squeezed during the galling process). For assembly, the wheel is slid "loosely" up along the shaft to its required position; if this is up to a step, or as determined by a jig, the requisite shims are then driven into place, while if the shaft is "roughened" the wheel is then driven on into place over the rough portion; and if located by lands, the shims are put in place between the lands, and the wheel is then driven on into position on the lands. Where, as may be the case, the shaft is a hollow tube, then once the wheel is correctly located the tube can be "expanded" (by driving a slightly oversize ball-like expanding tool along inside it) into contact with the wheel. In the case where the wheel is driven over a tight-fitting roughened area the friction-engendered forces involved activate the gall-promoter, while in the shim-using cases either the along-shaft motion of the wheel or shims (or the forced expansion of a tubular shaft) is itself enough to squeeze the shims to release the gall-promoter. Either the movement at the same time then causes the galling, bonding the wheel into place against further movement, or the emplaced wheel is subsequently rotated on its shaft (with a relatively low applied force) so that motion causes gall production (possibly with additional shim distortion and consequent gall-promoter release) and prevention of further movement.

The teeth of the gear-wheel, provided in the form of a ring, or hoop, of teeth, may themselves be secured to their wheel-like body, to form the entire gear-wheel, by the method of the invention (motor vehicle starter rings can be bonded to a supporting body in this manner). Here, where the body is essentially a thin disc, onto which the ring of teeth is driven (and usually secured by making the fit between the two a shrink or an interference fit), it is convenient, when applying the method of the invention, to use that motion as the gall-inducing motion. Thus, with a gear-ring that is merely a tight fit on its body, the body rim (say) is coated with the gall-promoter, and then simply driving the gear-ring onto the body results in the galling that locks the two together.

In essence very similar to the securing of a gear-wheel to its shaft is the mounting of a cam on a camshaft, except that whereas a gear-wheel is concentric with its shaft a cam, by its very nature, is eccentric albeit axio-symmetric, having at least one lobe projecting away from the shaft. This eccentricity means that the cam with advantage may be formed and secured in a number of ways other than the simple one (in which the cam member has a cam-shaped (lobed) body but with a shaft-shaped aperture, and is then located via its aperture on the shaft in much the same way as a gearwheel). More specifically, it means that the cam is able to be little more than a thin cam-surface-shaped ring, or collar, of a suitable material, with one or more lobe-like shim or jam that fits into the space under the cam's lobe between the shaft and the cam ring's inner surface so as to fill that space just as though the cam had a conventional "solid" body, and that the or each jam both provides support for the lobed cam surface and can constitute a carrier for the gall-promoter to be inserted between the relevant surfaces of the cam ring, the camshaft, and, of course, the jam itself.

It is, naturally, also possible to have a cam with a body of an "intermediate" shape—where the body is generally solid rather than a mere collar, but has an arcuate/crescent recess extending from its central aperture into the lobe volume, this recess accommodating a correspondingly-arcuate gall-promoter-carrying jam.

These methods of applying the invention to the mounting of cams on camshafts have several advantages over the more conventional ways of achieving that end. Firstly, with minimal effort and expense they provide extremely strong joints—for example, capable of resisting torques up to 450 Newton meters on a 22 mm shaft. They also enable the cam lobe to be hardened and finished to size quite separate of the shaft, so avoiding any chance of distorting the shaft when doing this subsequently, while the action of assembling the cam onto the shaft, and then securing it in place, can be accomplished without any significant cam lobe distortion (save that resulting from the lobe material's natural elasticity, which can easily be allowed for).

A crankshaft, with its eccentrically-mounted but coaxial web sections joined by journals, is another case of bodies mounted on a shaft where the actual securing of body to shaft can with advantage be effected by the method of the invention. If each shaft section has a web-receiving and -locating end portion of a slightly reduced diameter and coated with a thin layer of a suitable gall-promoter-carrying intermediate material, then assembly to precise dimensions in a jig, driving home each web onto its journals to cause the gall-derived body-locking friction, is an easy and convenient method of forming the crankshaft allowing the use of optimum hardened and ground journals, hollow for lightness and reduced inertia, and webs of durable thin steel sections, without the need for subsequent finishing treatment and avoiding the conventional cast or forged one-piece construction. A crankshaft made in this way can, by judicious selection of its materials, be made strong enough to handle over ten times the likely peak load.

Other types of Locking

One particularly advantageous application of the method of the invention is in making "pipe" joints, wherein a rod-like member—and particularly a tubular member—is abutted end to end with another such member to make in effect a longer object of the same kind. The principle involved is simple; the two rod-like members are placed end to end with a short collar member, or sleeve or ferrule, around the ends, the gall-promoter is inserted into the space between the rod exteriors and the collar interior, and initial movement of each rod relative to the collar activates the gall-promoter, causes friction-inducing galling, and prevents any further movement, so locking the rods each to the collar and thus to each other.

The manner in which the gall-promoter is inserted, and the subsequent relative movement is effected, may be any appropriate to the purpose of the joint being fashioned. For example, if the collar is a tight fit over the roughened gall-promoter-carrying side surfaces at the ends of the rods, then simply forcing the ends into the collar is sufficient. Alternatively, if the collar is a looser fit then, once the collar is properly located, jams may be driven in from either end to hold the assembly together, and there may be positioned within the assembly, and at each end between the collar and rod surfaces, an O-ring "seal"; either the jams or the O-ring seal, or both, can be carriers for the gall-promoter, and distribution of the promoter, followed by gall promotion, will occur either during the driving-in of the jams (as they and/or the O-ring distort) or in a subsequent rod/collar relative rotation.

One interesting variation of this rod/collar joint is that in which the collar itself is distortable—it can be squeezed down onto the rods—and incorporates an internal pre-formed ring-like gall—promoter carrier that will be squashed, to release its load of promoter into the interface, when the collar is so distorted. Moreover, by suitably arranging the structure of the collar, or by making the ring carrier of a material that will itself become involved in the gall-produced bonding, the very act of manipulating the collar to squash the ring causes the minimal initial movement that results in the desired joint formation. In one version the ring-like carrier is a sintered metal, itself forming part of the joint, while in another it is a sponge-rubber O-ring, and the collar itself contacts the rod to make the joint mechanically, the deformed O-ring then forming the seal.

Other joint types produceable by the method of the invention headless rivet joints, torque-limiting and tension joints, and energy-absorbing joints.

A rivet is a device with a headed shank for joining to two objects together when each has an aperture through which the shank can extend. A second "head" is then forged at the other end, both preventing the rivet pulling out of the holes and forcing, and holding, the two objects together. In a headless rivet the forces holding the two objects together are not those provided by the two "heads" joined by the shank, but are instead the frictional forces exerted on the two objects by the side surface of the shank as it extends tight-fitting through the two apertures (commonly such rivets are very slightly tapered—to an angle of about 4°—so that they can be inserted almost all the way into place before their sides contact the aperture sides and they jam into place). Clearly, by inserting into the interfaces a gall-promoter in accordance with the invention, then, as the shank is driven into place—or by twisting it slightly as it goes in, or once it is in place—the galling caused results in considerably increased friction between the shank and the aperture sides, so holding the rivet more tightly in position and the two objects more securely together. This situation is very like the violin string peg in its hole in the neck (save that there the peg is simply held in the hole rather than holding two objects together), even to the extent that the headless rivet's shank is slightly tapered, and fits into correspondingly tapered apertures in the two bodies. To supply the gall promoter to the interfaces the rivet may have a suitably grooved shank, or it may be made of, or be coated with, a porous sintered material.

Use of the method of the invention to form a torque-limiting joint may be exemplified by the provision of a bolt with a head which is bonded to its shank, as though it were a sleeve thereon, by gall-produced friction created by a gall-promoter in accordance with the method of the invention. By careful design of the area of the intersurface, or of the distribution thereover of the gall promoter, so the join between the head and the shank can be ensured to slip, the head moving round the shank rather than holding it firm to allow the nut to be done up even tighter, as the torque-engendered lateral forces overcome the movement-resisting friction.

A tension-limiting bolt is much the same, save that the bolt head is allowed to slip along the shank, so as to move to lengthen the shank (and thus reduce the tension therein) as the bolt is done up beyond a certain predetermined point.

An energy-absorbing joint, of the railway buffer type (wherein a piston moves within a cylinder against a restraining force usually provided by the resistance experienced as the piston is made to force a viscous liquid out through a small hole, or to crumple up some distortable body), may be constructed in accordance with the method of the invention. Thus, by feeding into the interface between the piston and the cylinder sides a suitable supply of gall-promoter, the gall-induced friction seeks to prevent further movement of the piston but fails—because the piston-driving forces are too high—whereupon the area of the interface increases as the piston moves, and more gall-promoter is fed into the growing interface, to result in more friction, until eventually the frictional forces are greater than the piston-driving forces, and the piston stops, having absorbed the energy incident thereon. Such an energy-absorbing joint can be large—like a railway buffer—or small—as in the type of automobile steering column designed to "crumple" and absorb the blow if in a crash the driver falls forward against it. By the physical design of the joint, and of the areas of the surfaces between which galling occurs (the sides of the piston rod may have patterns formed therein to define the actual active contact area, and so control the energy-absorption characteristics), the profile of energy absorption may be arranged to take any appropriate form.

One useful application of the method of the invention is in the sort of joint where a member is wedged into place in some sort of holder. For example, in many types of cutting tool the actual cutting blade, or bit, is a thin (and thus inexpensive) length of costly material—tungsten carbide, say—wedged into a slot in a relatively large holder/seat of some much cheaper substance, such as tool steel. Another instance is that of an aerofoil blade as used in a turbine (perhaps with an arcuate cross-section, to improve the packing of many blades in a small space, and thus the functional efficiency of the device), wedged into a corresponding slot in the central boss carrying all the blades. This is discussed further hereinafter with reference to the Drawings.

As will be apparent, there are many applications for the method of the invention, and the invention extends to them all per se, as well as to the joints and articles made thereby. In particular, it extends to camshafts, gearshafts and crankshafts wherein the cams, gear-wheels and webs have be secured to their shafts by such a method, and to pipes and other rod-like members that have been secured abutted one to the other by such a method.

Figure 3:
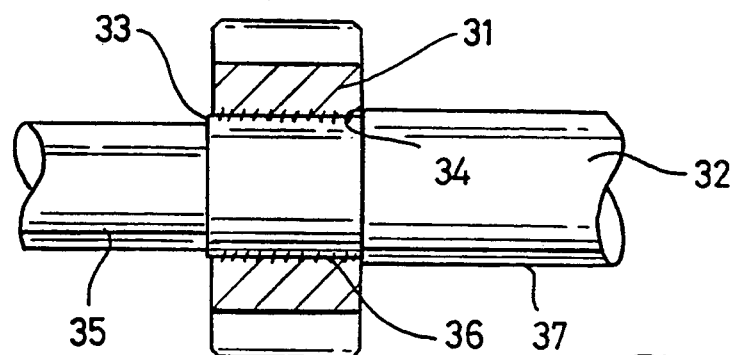
Figures 4A, 4B:
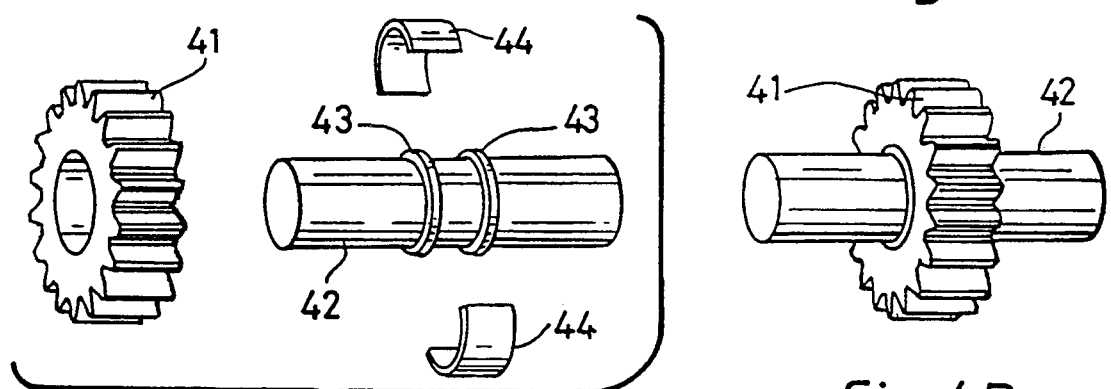
Figures 5A, 5B:
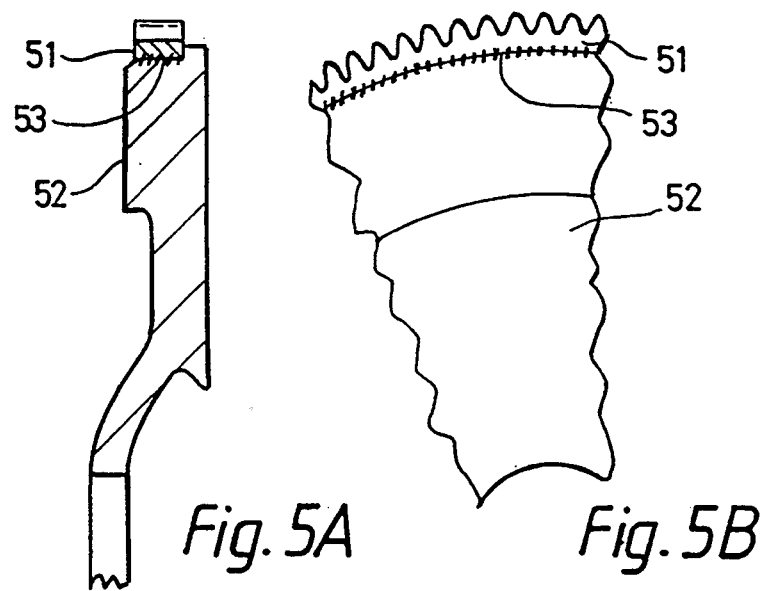
Figure 8A:
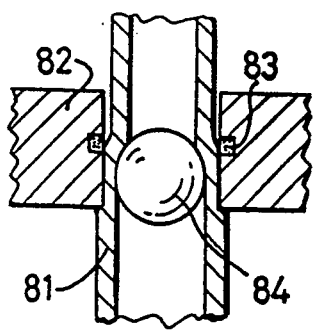
Figure 8B:
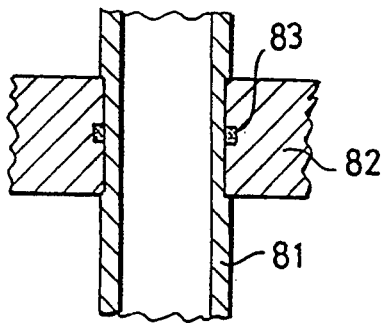
Figure 8C:
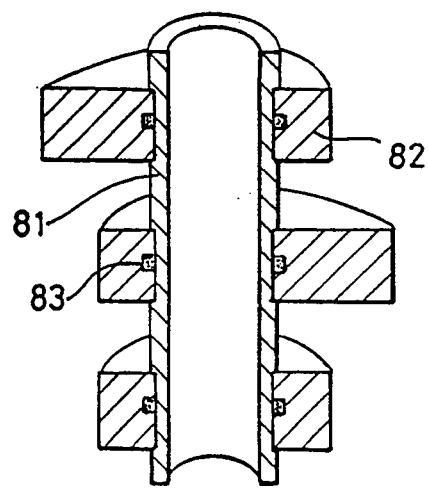
Figure 9A:
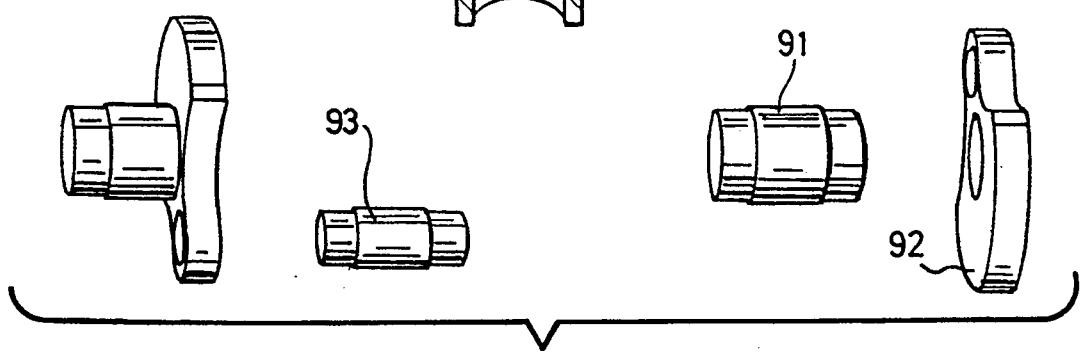
Figure 11A:
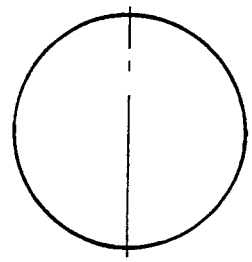
Figure 11B:
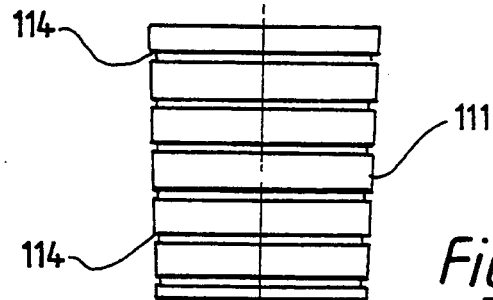
Figure 11C:
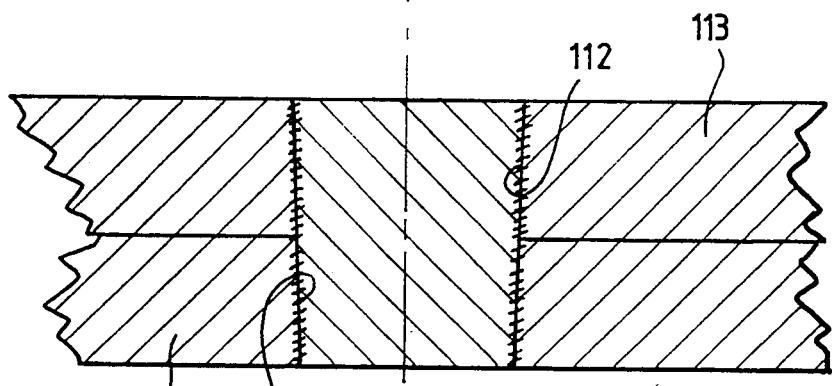
Figure 12:
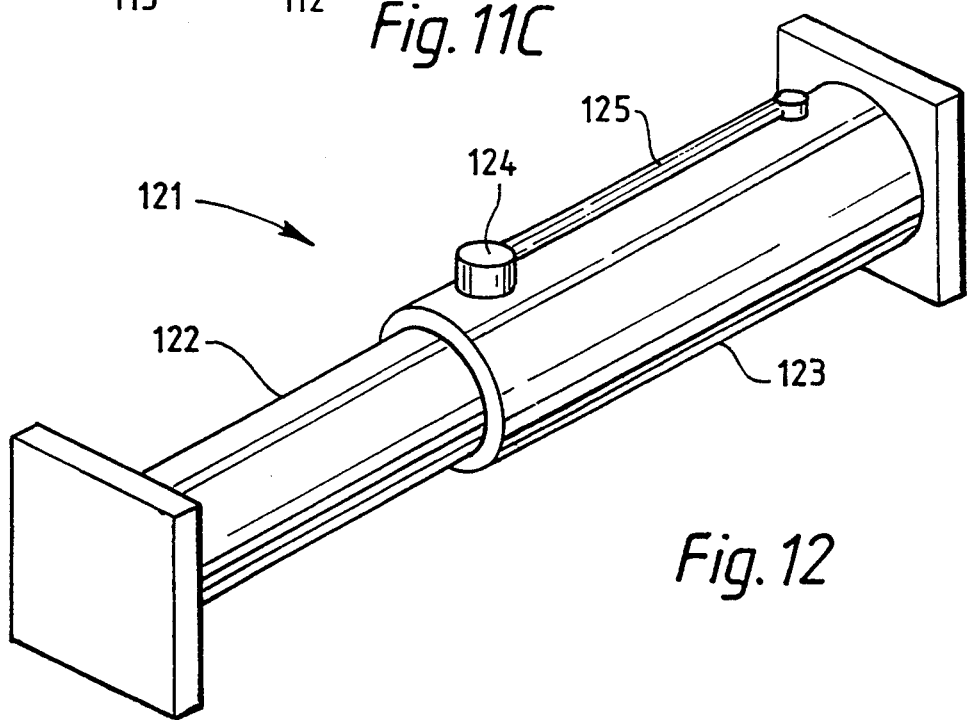
Figure 13A:
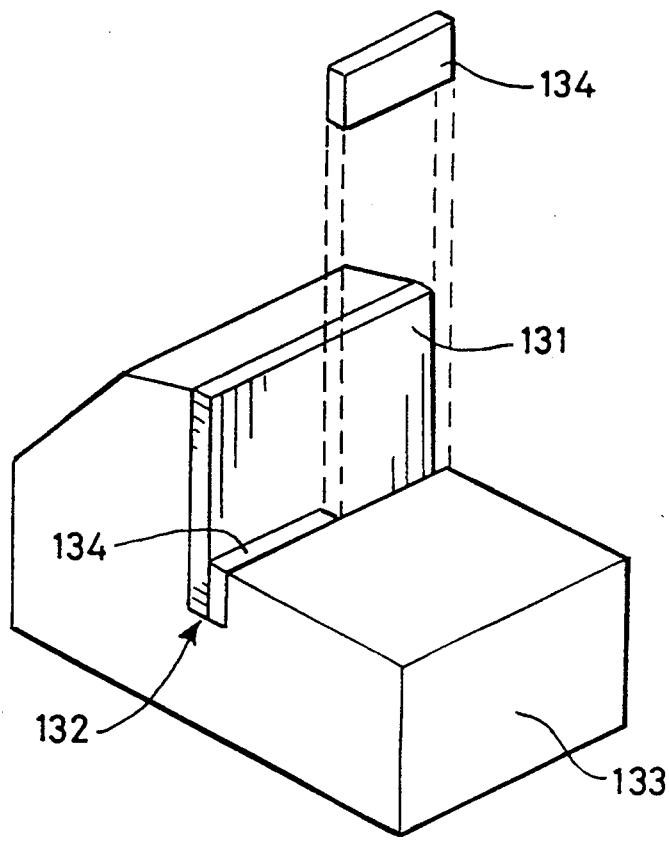
Figure 16:
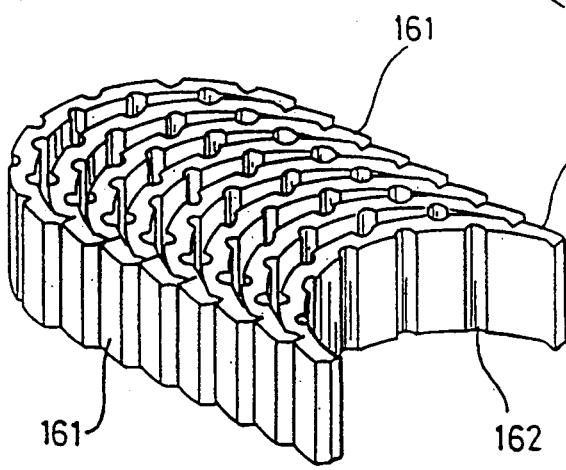

Various embodiments of the invention are now described, through by way of illustration only, with reference to the accompanying Drawings in which:

FIGS. 1A to D show a sequence of sectional views through a pair of surfaces being bonded together by the method of the invention;

FIGS. 2A to C show a section through a gear-wheel being secured to its shaft, and a section through and an end elevation of one of the jams used therefor;

FIGS. 2D*i* to 2D*iii* show a variant of the gear-wheel assembly of FIGS. 2A to C;

FIG. 3 shows a section through a shaft on which a gear-wheel is located at a step;

FIGS. 4A & B show a gear-wheel located on its shaft via lands;

FIGS. 5A & B show a part section and a part side elevation of a gear-ring secured to its wheel body;

FIGS. 6A to C show sections through three cams secured in different ways to their shafts;

FIGS. 7A to C show in perspective the cam-securing ways of FIG. 6 in more detail;

FIGS. 8A to C show in section another way of securing a cam on its shaft;

FIGS. 9A & B show in perspective a crankshaft assembled according to the invention;

FIGS. 10A to E show in section several slightly different ways of joining rod-like members invention;

FIGS. 11A to C show in section a headless rivet;

FIG. 12 shows an energy-absorbing "buffer";

FIGS. 13A & B show perspective part views of "linear" objects jammed into slots;

FIGS. 14A to 14D show various views of a plug, and how it is used to block an aperture;

FIGS. 15A to D show sectional views through torque- or tension-limiting bolts; and FIG. 16 shows in perspective a stack of semicircular jams.

In a number of the FIGS.—i.e. FIGS. 2C, 3, 5A & B, 10A & B and 11C-the line of the joined surfaces has been shown "hatched" to indicate the areas where galling occurs.

The "cartoon" sequence of FIG. 1 explains the basic concept behind the method of the invention. It shows the facing, and "in contact" micro-rough surfaces (11, 12) of two bodies (13, 14) held together by an applied force (arrows F). FIG. 1B shows the gall-promoter (15) inserted between the surfaces, whereupon they are moved sideways relative one to the other (represented by the left/right arrows M). As they move, the initial movement results in galling, where material (16) from the upper surface 11 is transferred to the lower 12. This galling builds up rapidly, to the point where the friction between the two surfaces is so great that provided the holding forces F are maintained the surfaces bind together (represented in FIG. 1D; FIG. 1D is at a slightly smaller scale than the others) as a result of the gear-tooth-like mechanical interaction between them, and further movement—except with a very considerable increase in the motion-causing forces—is prevented.

FIG. 2 shows the simple case of a gear-wheel (21; shown in part only) secured onto a gearshaft (22) using two gall-promoter-carrying bevel-edged collar-like jams (as 23; the inner and outer surfaces of the tubular jam is scored or grooved, as at 24, 25, to carry the gall promoter). Each jam 23 is a light interference fit into the space between the inner hole of the gear-wheel and the relevant surface of the shaft (but half the length of that space), so that as it is driven into place—one jam from each side—it is distorted enough to release some of the gall promoter, the relative motion between jam and either surface then causing galling, and binding the wheel to the jam and the jam to the shaft. In the improved version shown in FIG. 2D*i* to 2D*iii* the shaft 22 carries a single wheel-locating circumferential non-binding land (26) over which the wheel 21 is "centrally" positioned, two quarter-length jams (as 27) then being driven in one from each side.

In FIG. 3 there is shown one way of locating a gear-wheel (31) on its shaft (32); the shaft is stepped (at 33 and 34), so that the wheel is a loose fit on the thinnest part (35) of the shaft, a tight fit on the middle part (36), and won't pass the step 34 to the widest part (37). The middle part 36 of the shaft is knurled (not clearly shown), the knurling carrying the gall-promoter evenly distributed thereover, and the binding is a direct one between the wheel and the shaft. A drive flange could be attached in this way to a pump shaft.

Another way of locating a gear-wheel (41) on a shaft (42) is shown in FIG. 4A (showing the parts separated) and FIG. 4B (showing the parts assembled). The shaft has secured to it lands (as 43; of some non-binding material) between which fits "semi-circular" gall-promoter-carrying jams (as 44) and over which the wheel is a tight fit. When the joint is assembled the jams 44 are put in place between the lands 43, and the wheel is slid up the shaft and driven into position over the lands (to which it does not bind). As this occurs, the jams distort, to release the gall promoter, and further movement, perhaps by rotating the wheel around the shaft, causes galling, and as a result binding of the wheel to the jams (and the jams to the shaft).

FIG. 5 shows a gear-ring (51; a ring of gear teeth) binded onto the outer surface of a fly-wheel (52). The outer surface has been knurled (53), to hold a thin layer of gall promoter applied thereto, and the gear-ring 51 is a tight fit thereover, and is simply driven into place thereon.

FIGS. 6 and 7 show different ways of forming a cam on, or attaching a cam to, a camshaft. In FIGS. 6A and 7A there is shown a hollow camshaft (61) with a knurled portion (62) carrying the gall promoter. Onto this shaft is driven a cam member (63), to bind into place over the knurling. In this set of Figures the cam member 63 is a complete cam, with a central circular-section aperture (64) that fits the circular-section shaft 61. In FIGS. 6B and 7B, however, the cam has an additional crescent notch (65) in it, and is secured onto the shaft using a pair of corresponding crescent-shaped porous jams (as 66), one inserted from each side.

The combination of FIGS. 6C and 7C is different again. Here the cam is merely a uniform section tube (67) squashed into a cam outline and driven over the shaft and a cam-lobe-shaped jam (68). The lobe jam 68 both supports the cam outline tube (67) and jams it (by the galling) firmly into place.

Yet another way of securing members such as wheels or cams to a shaft is shown in FIG. 8. This method requires the use of a tubular shaft (81) and oversize [cam] members (as 82), each with an internal groove (83) acting as a reservoir for the gall promoter. The cam members are slid into place on the tube, and held in a jig, and then a hardened slightly oversize ball (84) is driven (FIG. 8A) along the interior of the tube, expanding the tube into contact with the inner surface of the cam members as it does so (FIGS. 8B, 8C). The cam is then rotated to its correct angular orientation, and in doing so the joint is formed.

Figure 9B:
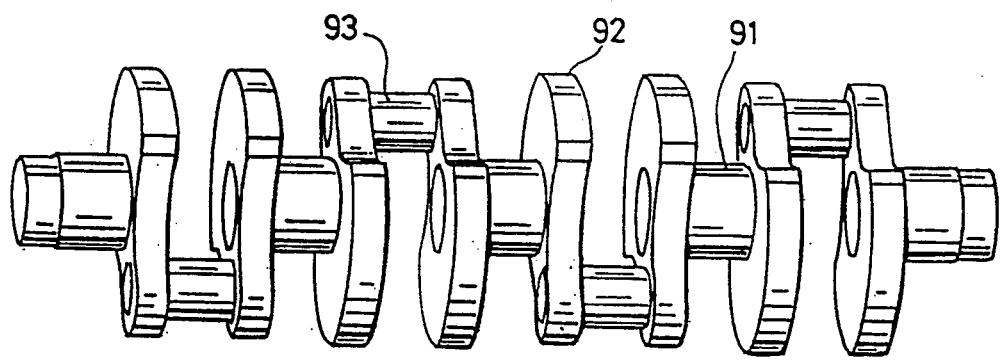

FIG. 9 shows the components of a crankshaft-some of the main journal tubes (91), the web portions (92), and the big end journal shafts (93) are shown separately in FIG. 4A, and are shown assembled into a complete crankshaft in FIG. 9B using the method of the invention.

In FIG. 10 there are shown several different ways of securing in an abutting relationship two rod-like members. In FIG. 10A two rods (as 101) are joined by a collar (102) located by circlips (as 103) secured by galling-induced friction, according to the method of the invention. FIG. 10B shows a somewhat more sophisticated way of achieving much the same end, but joining two tubes (as 104). The collar (105) has a central tube-locating inner flange (106), a rubber O-ring seal (as 107) is emplaced from each side, and then two tubular sleeve-like sintered gall-promoter-carrying jams (as 108) are inserted, one from each side, to hold the assembly together. Driving them in causes galling, and the resulting friction binds the two tubes 104 to the collar 105, and thus to each other, the O-ring seals being deformed to seal the join. A close variant of this is shown in FIG. 10C, where each O-ring seal 107 is separated from the associated jam 108 by an inner ring (as 211). This arrangement is especially good for a high pressure joint.

Figure 10A:
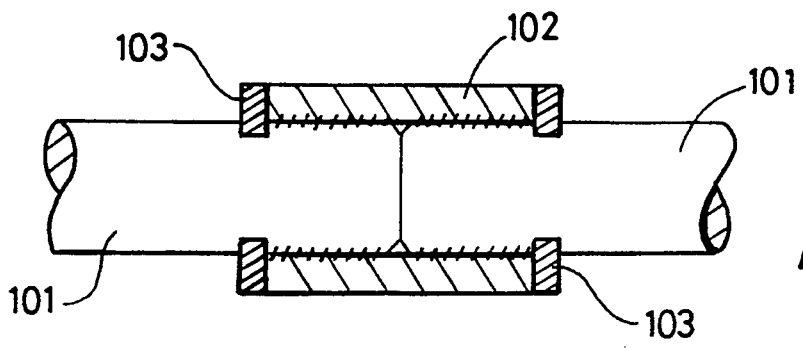
Figure 10B:
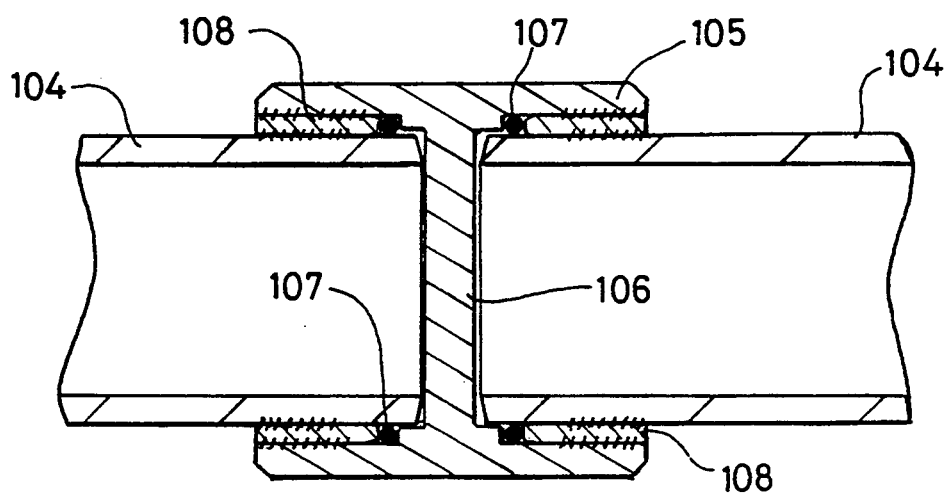
Figure 10C:
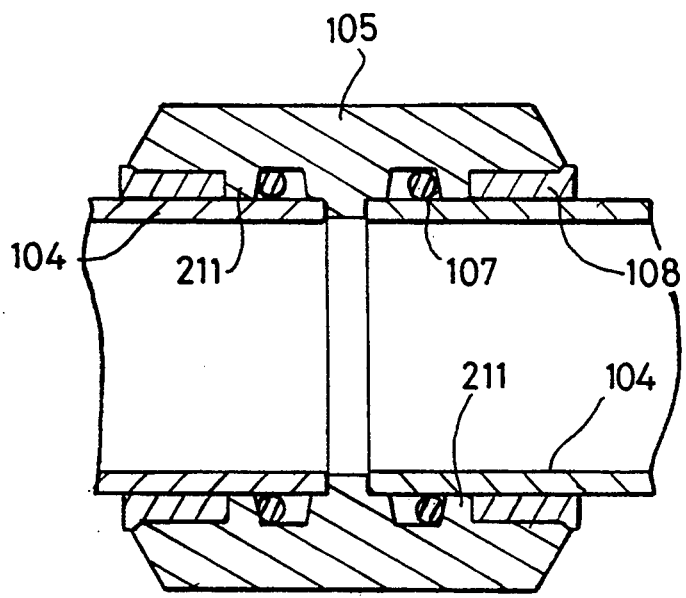
Figure 10D:
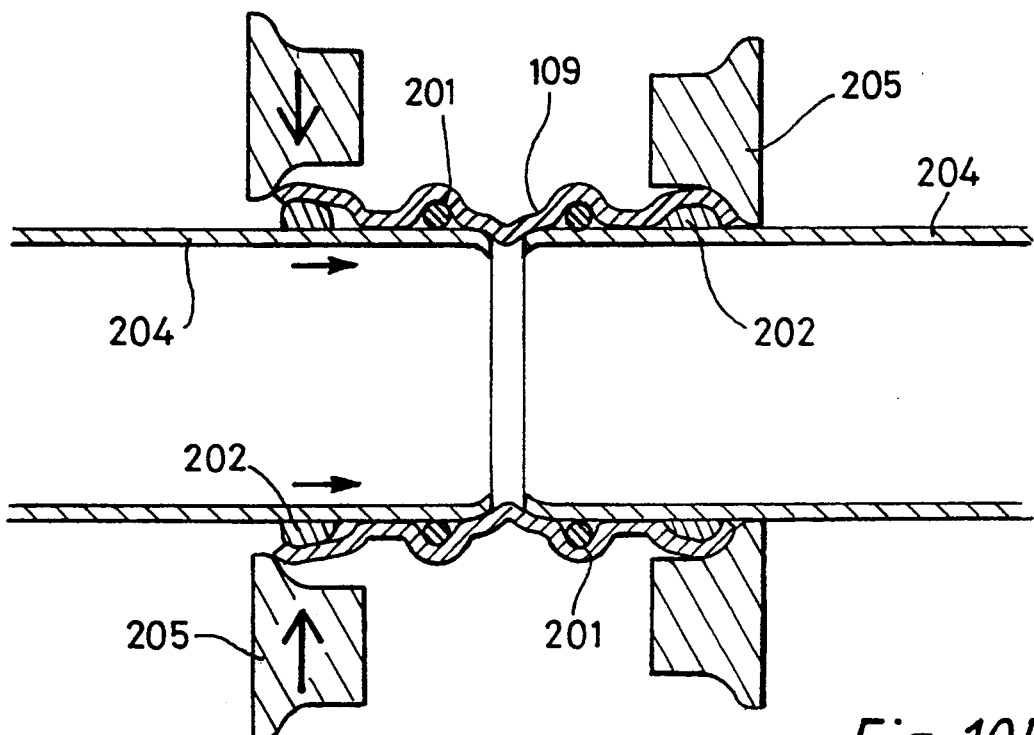
Figure 10E:
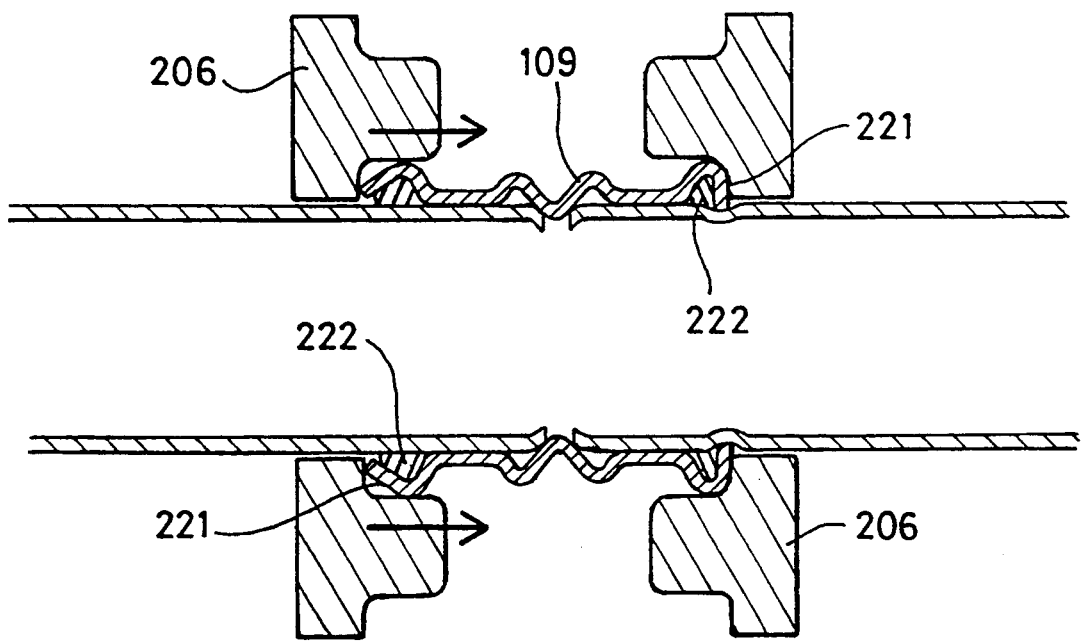

A different tube joining method is shown in FIG. 10D. A corrugated collar 109 containing both sealing O-rings (as 201) and gall-promoter-carrying metal ring-like jams (as 202) holds the two tubes (as 204) together. After assembly, wheel-like collar-compressing rollers (as 205) are employed to compress each jam 202 both down onto the tube and along towards the abutment (as shown by the arrows). This causes galling and binding of the tubes to the rings, and the rings to the collar—and thus the tubes are secured together. This type is suited as a medium-pressure joint. A variant, more suited as a low-pressure joint, is shown in FIG. 10E. Here, the ends (as 221) of the collar 109 are rolled into hard contact with the tubes 204, and the thus-squeezed gall-promoter—impregnated O-rings (as 222) discharge the agent to cause that contact to become gall-controlled binding joins of the invention, thus holding the two tubes together (the compressed O-ring forms the seal). In this case, the rollers (as 206) act only along the tube, merely folding the ends of the collar down.

FIG. 11 shows a headless rivet (111) secured into the aligned rivet-receiving holes (as 112) of two plate-like bodies (as 113). The rivet is very slightly tapered (so it can be driven tightly into the two holes), and is externally scored/grooved (as 114) to carry the gall promoter. Driving it into the aligned holes activates the gall promoter and so causes the friction-derived binding, riveting the two bodies together.

In FIG. 12 there is shown a buffer device (generally 121) in which energy is absorbed by driving one part (122) telescopically within the other (123), like a piston within a cylinder, against galling-induced friction caused by the method of the invention. A constant supply of gall promoter is supplied into the "fresh" areas of the joint, as it is formed, from the small reservoir (124), and to ensure this a feedback line (125) brings air, pumped out of the cylinder 123 as the piston 122 moves into it, back to the reservoir 124 to force the gall promoter into the joint.

Objects can be secured into slots—as "key fits"—using the method of the invention, and two examples of this are shown in FIG. 13. In one case (13A), a cutter blade or tooth (131) of tungsten carbide is mounted within a slot (132) and held against a support in a tool steel holder (133) by means of two wedges (as 134) each of which is a gall-promoter-carrying steel jam (the cobalt binder in the tungsten carbide binds readily to steel to form a good joint). As the jams 134 are driven in so the resulting galling firmly holds the cutter blade 131 in place.

Figure 13B:
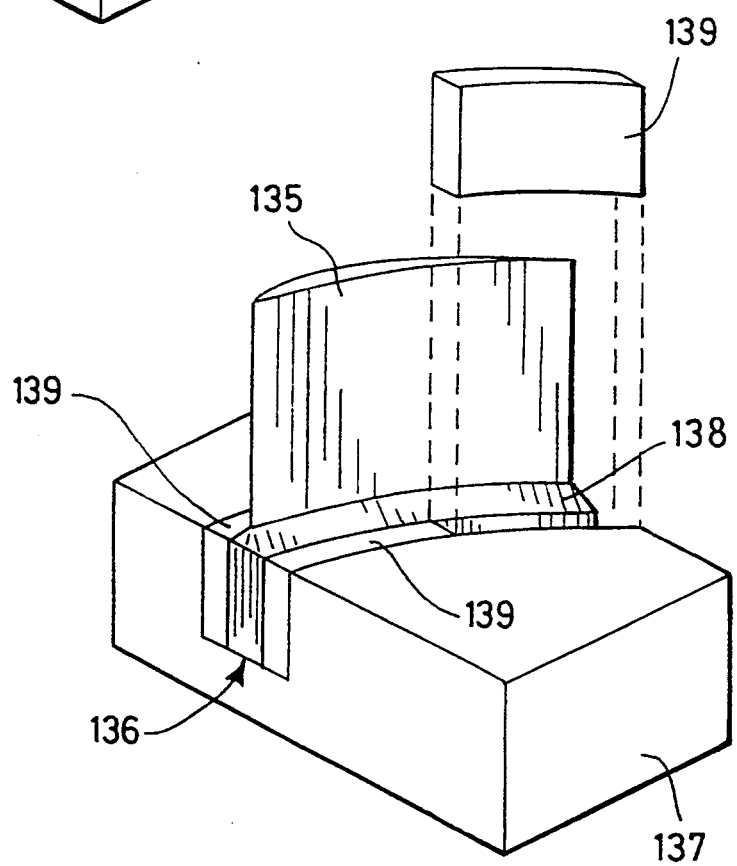

Much the same concept is shown in FIG. 13B, but here an aerofoil blade (135) is being secured into its slot (136) in a rotor or stator (137), and the blade base (138) is slightly curved (for efficient packing), the slot being correspondingly curved, and held in with four suitably curved jams (as 139) in fore-and-aft pairs.

Figure 14:
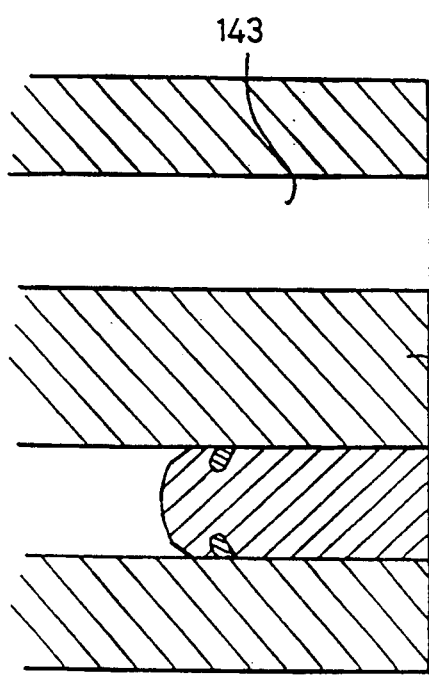
Figure 14:
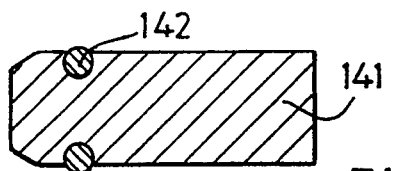
Figure 14:
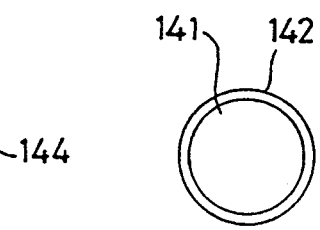
Figure 14:
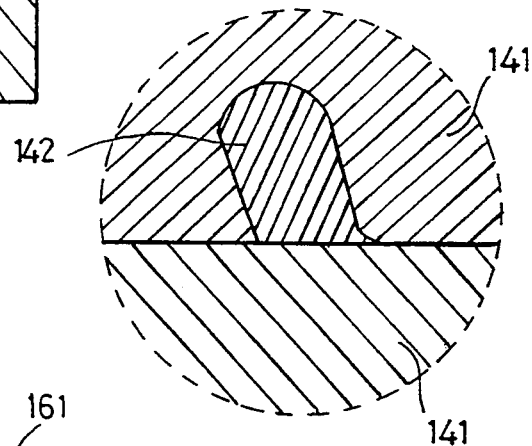

There are many cases where complex passageways need to be constructed in large blocks, examples being the fuel-ways in carburettors and the oil- and water-ways in engine blocks. It is common to drill these from the outside, and then afterwards block off, with blanking plugs, any that shouldn't actually open to the outside. The method of the invention can be employed to secure these plugs in place, and this is shown in FIG. 14A to 14D, where a deformable plug (141) with a gall-promoter-carrying O-ring (142) at its inner end FIG. 14B is driven into the passageway (143) in the body (144) (FIG. 14A), the plug distorting to squeeze the O-ring, "eject" the gall promoter, and bind itself to the passageway walls. The compressed O-ring forms the seal.

Though for the most part the joints made by the invention will be intended to be permanent, valuable use can be made of their ability to slip under very high loads (and then to re-form once the load is removed or reduced). An example of this is in torque- or tension-limiting bolts, as shown in FIG. 15. A tension-limiting bolts is shown in FIGS. 15A to 15D; a head (151) is "slidably" mounted (as a light interference fit) on a shank (152) by way of a shearable gall-promoter carrying ring (153: seen best in the detail FIG. 15C). As the bolt is tightened into place (the body it is in, and the nut on the other end, are not shown), so the tension in the shank rises to the point where the head 151 slides (up as viewed) along the shank 152, shearing the ring 153 and releasing the gall promoter. Further movement then binds the head to the shank, but in a controlled, predictable manner, such that the binding forces can be overcome by the application of further force (as the bolt is tightened even more), so that instead of the bolt tension actually rising the head continues to slide along the shank, but in a controlled, predictable fashion. When the applied "tightening" torque forces are reduced, or removed, the joint binds again, and the bolt holds the body secure. An O-ring seal (154) retains the gall promoter in the joint, preventing it reaching the threads and causing them to bind unacceptably.

Figure 15A:
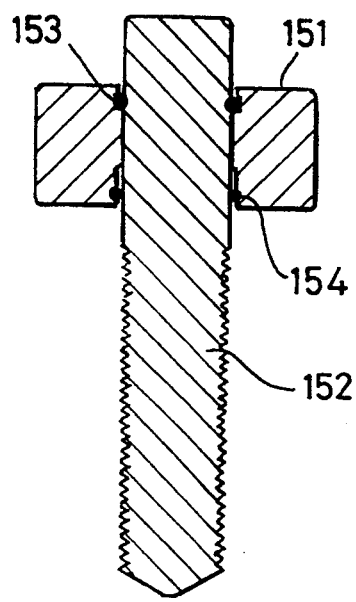
Figure 15B:
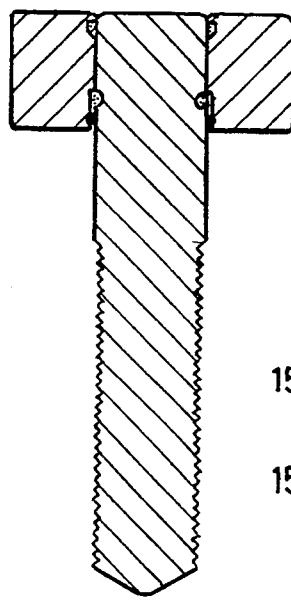
Figure 15C:
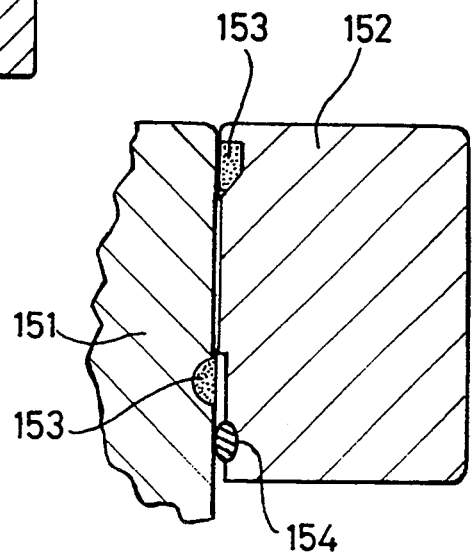
Figure 15D:
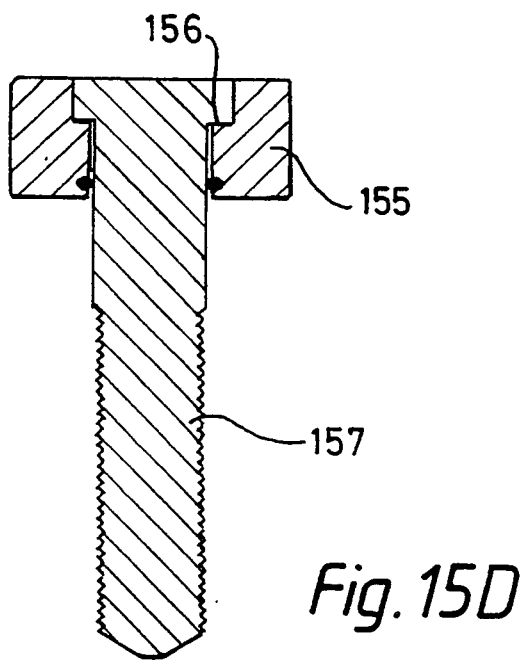

A variant of this is the torque-limiting bolt of FIG. 15D. Here, the bolt's head (155) is internally stepped, and fits onto a corresponding step (at 156) at the end of the shank (157). The head is binded to the shank by a slippable joint of the invention—designed to slip at a predetermined torque—and as that limit is reached so it does so, and no further turning of the head can turn the shank—and so the bolt cannot be tightened any more.

In FIG. 16 there is shown an interlocking stack of sintered arcuate jams (as 161)—a stack facilitates jam impregnation, storage and automatic insertion by machine—of a type suited for use in making rods and pipe connections. Each jam has a number of longitudinal grooves (as 162) to allow lateral deformation—"radial flow"—in the james as they are inserted, so improving the gall interlock tensile strength.

I claim:

1. A method of securing against lateral motion two bodies held in face-to-face asperity contact, thereby to make a joint between the two bodies, which method is characterised in that there is inserted into the interface between the two bodies a material that on minimal initial lateral relative motion of the two surfaces promotes rapid but controllable "galling" between the two surfaces, this galling binding the surfaces against further such motion.

2. A method as claimed in claim 1, which is applied to forming a joint between the two bodies where the shape of the bodies, and the way in which they interact, is such as to hold them together, and the joint prevents them sliding relative to one another sideways to the holding forces.

3. A method as claimed in claim 1, which is applied to make a joint between two hard bodies, in which there is employed an intermediate body, of a softer material, disposed between the two hard bodies, so that the one hard body binds to the softer intermediate, and the intermediate binds to the other hard body.

4. A method as claimed in claim 1, in which the gall-promoting material inserted into the interface between the two bodies is a silicone oil.

5. A method as claimed in claim 4, in which the silicone oil is one or more medium molecular weight polysiloxane.

6. A method as claimed in claim 1, in which the gall-promoting material is inserted into the interface between the two bodies using a porous carrier positioned immediately adjacent the interface within the joint itself to hold the gall promoter, and in which the carrier is squashed or otherwise deformed to release the agent into the joint upon the initial movement of the two surfaces.

7. A method as claimed in claim 6, in which the carrier is a sintered metal or a natural or synthetic sponge material.

8. A method as claimed in claim 1, in which the speed of the initial gall-promoting motion is such that the motion is complete within half a second.

9. A method as claimed in claim 1, in which the minimal initial lateral motion employed to cause the rapid galling between the two surfaces is a bodily sideways slipping motion of one piece relative to another, and is either a relative linear displacement of a few millimeters, or a relative angular displacement of a few degrees.

10. A method as claimed in claim 1, which is employed to make a joint that is subsequently to be allowed to slip, and in which, to allow the joint to re-form after slipping, the retention of at least some of the gall-promoting agent between the surfaces is achieved by sealing the joint area to prevent the agent escaping, by a step selected from including within the joint a small reservoir, opening to the interface (for the agent), or by employing a carrier for the agent which stores enough to provide sufficient for at least a second galling and joint-formation operation.

11. A joint between two bodies constrained in face-to-face contact and binded against lateral motion by the method as claimed in claim 1.

12. A joint as claimed in claim 11, which is of the type wherein a piece is locked against rotation onto shafts.

13. A joint as claimed in claim 12, wherein the piece is located on its shaft by at least one ring-like land of a non-binding material standing slightly proud of the surface, on which land the piece is a tight fit, the space on either side of the land, or between the lands, being filled with a porous collar carrying the gall-promoting material.

14. A joint as claimed in claim 11, which is of the type wherein pieces are locked together against both rotation and translation via a joining collar.

15. A joint as claimed in claim 14, which is between two rod-like or pipe-like members and a connector ferrule, and wherein, using a ferrule of a loose fit, then, once the ferrule is properly located, jams are driven in from either end, and where the joint is between pipes, there is positioned, and at each end between the ferrule and pipe surfaces, a ring-like "seal".

16. A joint as claimed in claim 12, wherein the piece is a cam having a cam lobe and the shaft is a camshaft, and wherein the piece is in the form of a thin cam-surface-shaped ring of a suitable material, with a lobe-like jam that fits into the space under the cam's lobe between the shaft and the cam ring's inner surface.

17. A joint as claimed in claim 12, wherein the piece is a lobed cam and the shaft is a camshaft, and wherein the piece takes the form of a cam-shaped ring that is generally solid but has an arcuate/crescent recess extending from its central aperture into the lobe volume, these recess accommodating a correspondingly-arcuate gall-promoter-carrying jam.

* * * * *